(12) United States Patent
Simpson

(10) Patent No.: US 6,942,247 B2
(45) Date of Patent: Sep. 13, 2005

(54) DRIVER AIRBAG FORMED CONTACT SPRING

(75) Inventor: James J. Simpson, Fairborn, OH (US)

(73) Assignee: Delphi Technologies, Inc., Troy, MI (US)

( * ) Notice: Subject to any disclaimer, the term of this patent is extended or adjusted under 35 U.S.C. 154(b) by 43 days.

(21) Appl. No.: 10/386,780

(22) Filed: Mar. 12, 2003

(65) Prior Publication Data

US 2004/0178611 A1 Sep. 16, 2004

(51) Int. Cl.⁷ .......................... B60R 21/16; B60R 21/20; H01H 9/00
(52) U.S. Cl. ................. 280/731; 200/61.54; 200/61.55; 200/61.57
(58) Field of Search .............................. 280/731, 728.2; 200/61.54, 61.55, 61.57; B60R 21/16, 21/20

(56) References Cited

U.S. PATENT DOCUMENTS

| | | | | |
|---|---|---|---|---|
| 5,508,481 A | * | 4/1996 | Williams et al. | 280/731 |
| 5,593,178 A | * | 1/1997 | Shiga et al. | 280/731 |
| 5,650,600 A | * | 7/1997 | Walters | 200/61.54 |
| 5,716,068 A | * | 2/1998 | Sahara et al. | 280/731 |
| 5,727,811 A | * | 3/1998 | Nagata et al. | 280/731 |
| 5,957,489 A | * | 9/1999 | Sahara et al. | 280/731 |
| 6,079,737 A | * | 6/2000 | Isomura et al. | 280/731 |
| 6,082,758 A | | 7/2000 | Schenck | 280/728.2 |
| 6,149,188 A | | 11/2000 | Simpson et al. | 280/731 |
| 6,199,908 B1 | * | 3/2001 | Isomura et al. | 280/731 |
| 6,361,064 B1 | | 3/2002 | Hopf et al. | |
| 6,457,379 B1 | * | 10/2002 | Mirone | 280/731 |
| 6,592,141 B1 | * | 7/2003 | Dancasius et al. | 280/731 |

FOREIGN PATENT DOCUMENTS

| | | | | |
|---|---|---|---|---|
| EP | 0739786 A2 | * | 10/1996 | B60R/21/20 |
| EP | 1010589 A2 | * | 6/2000 | B60R/21/20 |
| JP | 8295200 A | * | 11/1996 | B60R/21/20 |
| JP | 9254791 A | * | 9/1997 | B60R/21/20 |
| WO | WO 00/74980 A1 | | 12/2000 | B60R/21/20 |
| WO | WO 02/43989 A2 | | 6/2002 | |

* cited by examiner

Primary Examiner—Paul N. Dickson
Assistant Examiner—Joselynn Y. Sliteris
(74) Attorney, Agent, or Firm—Scott A. McBain

(57) ABSTRACT

A method and apparatus for reducing gap variation between an airbag module and a steering wheel insert while acting as a horn switch for a horn. The apparatus includes a contact spring disposed between the airbag module and the steering wheel insert. The spring has at least two raised locations having one side of each raised location biasing the airbag module in a first direction while an opposite second side thereof electrically connects with a contact when the airbag module is biased in a second direction opposite said first direction to actuate the horn. An insulative spring retainer has one surface disposed on the steering wheel insert and an opposite surface configured to retain the contact spring. The retainer is further configured to operably couple with the steering wheel insert and includes at least one contact aligned with a corresponding raised location to actuate the horn upon electrical contact therebetween.

25 Claims, 4 Drawing Sheets

US 6,942,247 B2

DRIVER AIRBAG FORMED CONTACT SPRING

TECHNICAL FIELD

The present disclosure relates generally to vehicle horn systems and, more particularly, vehicle horn systems used in conjunction with an airbag module.

BACKGROUND

Vehicles are supplied with driver's side airbag modules; generally the driver's side airbag module is located in the center of the steering wheel. This is also the same location where a horn-activating switch has traditionally been mounted.

Various mounting mechanisms have been used for securing the inflatable restraint module to a support structure in a vehicle, such as a steering wheel or dashboard. In one known mounting mechanism, mounting bolts are provided passing from a rear of the support structure and threadably engaging nuts mounted on the inflatable restraint module. In another known mounting mechanism for a vehicle steering wheels sleeve members mounted to the inflatable restraint module and surrounding the mounting bolts may be forced into contact with a plate forming the supporting structure on a hub portion of the steering wheel to complete a circuit for actuating a horn.

Eventually, the horn-activating switch was adapted for mounting on the underside of the airbag module wherein the module was mounted in a "free floating" arrangement to allow the user to activate the horn by applying an activation pressure to the module and move the driver's side airbag module into a horn activation position. Such horn-activating switches react to a user-applied force to the cover in an effort to sound the horn. For example, and in such a system the entire airbag module moves as force is applied to actuate the horn.

Most original equipment manufacturers (OEMs) style their driver's side airbag modules and steering wheels by using a contoured gap between the two parts. This gap primarily allows the driver's side airbag module to move freely relative to the Class A surfaces of the wheel (free movement is required for a floating horn system). However, the OEMs also contour these gaps so that they contribute to the overall style and appearance of the driver's side airbag module and steering wheel assembly.

Once attached, the module is capable of movement through the application of a user-applied force wherein a horn circuit is completed in accordance with known technologies. The module is biased in a non-contact or open circuit position by a plurality of biasing springs. A current apparatus for a snap-in floating horn system uses the combination of three components at each point of attachment. The three components are a locking pin extending from the driver's side airbag module, a locking spring attached to the wheel, and a plastic insulator also attached to the wheel. These three components work in conjunction and can be arranged to create a two, three, or four-point driver's side airbag module attachment to the wheel. During module attachment, the locking pin goes through a slot in the insulator, displaces a locking spring attached to the insulator or the steering wheel, and locks into the wheel after the locking spring moves back to its original position thereby engaging a groove in the locking pin.

The current floating horn mechanism having a two point snap in attachment, for example, has many parts (e.g., 33) and assembly thereof involves using expensive assembly equipment and results in horn contact gap variations and driver air bag (DAB) cover to steering wheel (SW) fit variations and spoke gap variations as a result of stack height tolerances of the assembled parts. Accordingly, it is desirable to reduce the number of parts, costs, and horn contact gap variation, as well as DAB cover to SW fit and spoke gap variation. It is further desired to have a design that will be compatible with two, three or four point snap in DAB designs.

SUMMARY

This disclosure relates to a method and apparatus for reducing gap variation between an airbag module and a steering wheel insert while acting as a horn switch for a horn. The apparatus includes a contact spring disposed between the airbag module and the steering wheel insert. The spring has at least two raised locations having one side of each raised location biasing the airbag module in a first direction while an opposite second side thereof electrically connects with a contact when the airbag module is biased in a second direction opposite said first direction to actuate the horn. An insulative spring retainer has one surface disposed on the steering wheel insert and an opposite surface configured to retain the contact spring. The retainer is further configured to operably couple with the steering wheel insert and includes at least one contact aligned with a corresponding raised location to actuate the horn upon electrical contact therebetween.

DETAILED DESCRIPTION

This disclosure relates to an airbag module connection assembly 8 for use with "flat-form, snap-in" driver's side airbag module/floating horns. It can be used for a two-point, three-point, or a four-point snap-in driver's side airbag modules. In addition, the airbag module connection assembly 8 of the present disclosure is contemplated for use with other types of snap-in driver side airbag modules having floating horns (e.g., non-flat-form, snap-in pins). Referring now to the Figures, the present disclosure provides a method and apparatus for reducing gap variations between an airbag module and a steering wheel insert while reducing the number of parts needed for the airbag module connection assembly having an operable horn incorporated therewith. Furthermore, the spring rate and gap are variable through the use of varying the assembled stack height load of an insulative spring retainer assembled with a formed contact spring that biases the air bag module away from the steering wheel insert while also acting as a open horn switch for operation of the vehicle horn.

Airbag module connection assembly 8 provides a means for allowing an airbag module to be connected to a steering wheel armature or insert 20 or equivalent structure as well as allowing movement of the airbag module from a first position to a second position in order to complete a horn activation circuit. The airbag module connection assembly 8 also prevents unwanted or undesired movement in directions, which would create a non-uniform gap between an edge of the airbag module and its surrounding structure, which may comprise portions of the steering wheel that do not include the airbag module but are adjacent to its periphery.

In an exemplary embodiment at least one or a plurality of airbag module connection assemblies are used to maintain the module in the desired position as it is moved between the contact (horn activation) and non-contact positions.

Figure 1:
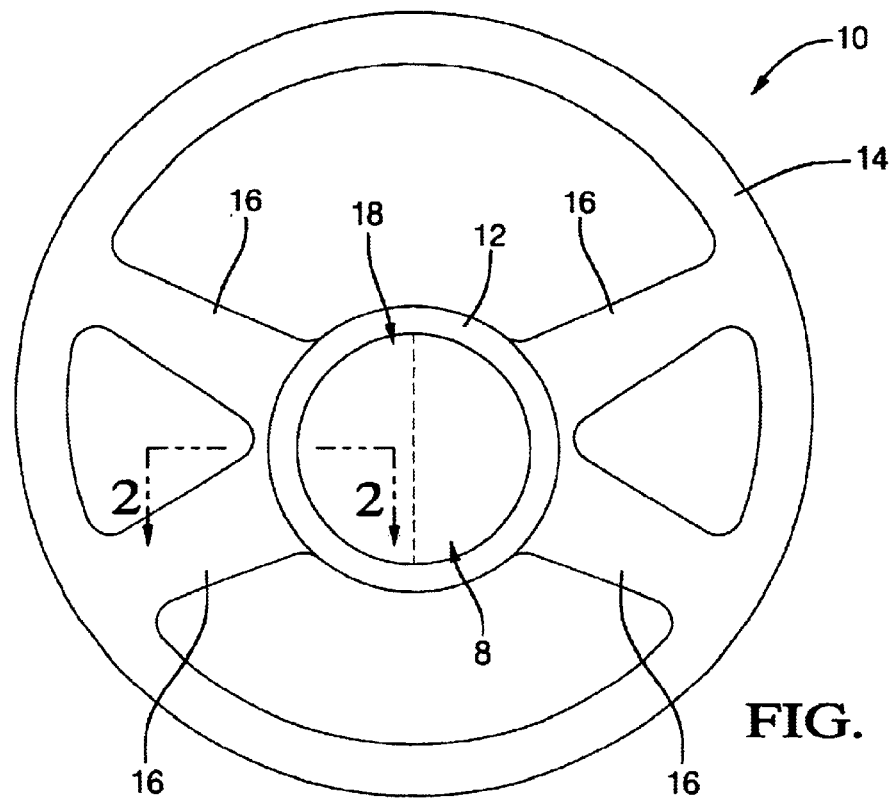
FIG. 1 is plan view of an air bag module and steering wheel assembly.

Referring first to FIG. 1 of the drawings in detail, numeral 10 generally indicates a steering wheel for a vehicle. The steering wheel 10 includes a central hub portion 12, a generally circular outer rim portion 14 and a plurality of spokes 16 extending between the hub portion 12 and the rim portion 14. An air bag module 18 is mounted within the hub portion 12. The steering wheel 10 is affixed to a steering column (not shown).

Figure 2:
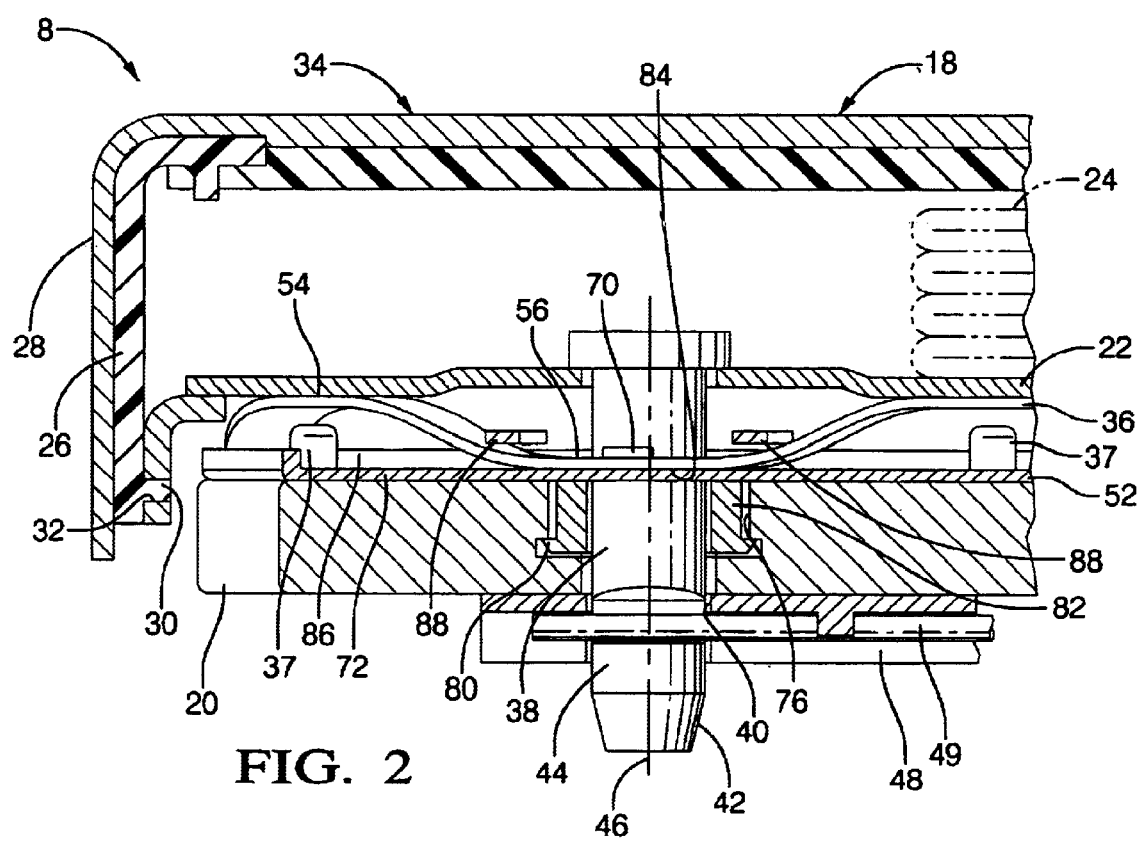
FIG. 2 is a cross-sectional view from the line 2—2 of FIG. 1.

Referring to FIG. 2, a steering wheel insert 20 is provided which is fixed to a steering column, not shown, on which the steering wheel 10 is mounted. The air bag module 18 is attached to the steering wheel insert 20 through means to be subsequently described.

The air bag module 18 has a base plate 22 for mounting an air bag 24 and an inflator (not shown). The base plate 22 is made from an electrically conductive material. The air bag 24 and the inflator are enclosed within a container 26 which is covered by an outer pad 28. Preferably, the container 26 is secured to the base plate 22 by snapping lugs 30 spaced around the container's periphery into slots 32 of the base plate 22. Alternatively, the container can be secured to the base plate by fasteners, such as screws.

A horn depression area 34 is proximate a top surface defining air bag module 18 corresponding to the top of outer pad 28. A horn circuit includes electrical wires (not shown) that are activated when area 34 is depressed. In one embodiment, one of the electrical wires is connected to a power source and the other to the base plate 22 which are parts of the horn circuit. The horn circuit includes depression area 34, base plate 22, a formed contact spring 36, and at least one contact 37 preferably in electrical contact with steering wheel insert 20, steering column, power source and horn. It will be understood that contact 37 is preferably connected to one of the electrical wires to form a positive or negative terminal connection. Alternatively, contact 37 is optionally electrically connected to ground, for example, the steering column. Upon application of pressure to depression area 34, the conductive surfaces (e.g., contact spring 36 and contact 37 are brought together to close the horn circuit and actuate the horn. If an isolated ground is required, the land locations of the DAB would be insulated at spring crests and contact points would be established elsewhere on the DAB baseplate 22 for contact with spring 36.

For mounting the air bag module 18 on the steering wheel insert 20, one or more elongated cylindrical mounting members 38 are affixed to the base plate 22 and extend therefrom into apertures 40 of the steering wheel insert 20. The contact spring 36, made of an electrically conductive material, is configured as a wave spring and is retained by an insulative retainer 52 while compressingly disposed between the base plate 22 and the steering wheel insert 20. The wave shape of spring 36 allows it to provide an electrical connection, or ground path, between the air bag module 18 and steering wheel insert 20, completing the horn circuit. By providing the ground path, for example, the formed contact spring 36 eliminates the need to connect the ground wire from the air bag module 18 directly to the steering wheel insert 20. The contact spring 36 also biases the air bag module 18 outwardly away from the steering wheel insert 20.

In one embodiment illustrated in FIGS. 1–1, two mounting members 38 are attached to the base plate 22. Each of the mounting members 38 includes a tapered distal end 42 and a slot 44 which is elongated in a direction parallel to a longitudinal axis 46 of the mounting member 38.

The steering wheel insert 20 is formed with apertures 40 corresponding in number and location to the number and location of the mounting members 38. The apertures 40 receive the distal ends 42 of the mounting members 38 therethrough. A spring housing 48 is mounted proximate and preferably within each aperture 40 of the steering wheel insert 20 (See also FIG. 6). The spring housings 48 are preferably formed of an insulating material, such as a plastic.

Each of the spring housings 48 contains a resilient member, such as a spring 49. When each spring 49 makes contact with the mounting member 38, as the air bag module 18 is assembled with the steering wheel insert 20, the spring 49 yields in a direction transverse to the longitudinal axis 46, permitting insertion of the mounting members 38 through the apertures 40 and past the springs 49, as best seen with reference to FIG. 6. After the mounting members 38 are fully inserted, the springs 49 slide into the respective slots 44 of their respective mounting members 38, thereby retaining the mounting members 38 within the apertures 40.

Contact spring 36 biases the air bag module 18 outwardly from the steering wheel insert 20 and provides a ground path between the base plate 22 and the steering wheel insert 20 to complete the horn circuit. Thus, the horn circuit is grounded upon the mounting of the air bag module 18 to the steering wheel insert 20, without the direct connection of a ground wire. Alternatively, it will be recognized by one skilled in the pertinent art that contact spring 36 optionally acts as a positive or negative terminal for operable connection with contact 37 to complete the horn circuit.

Figure 3:
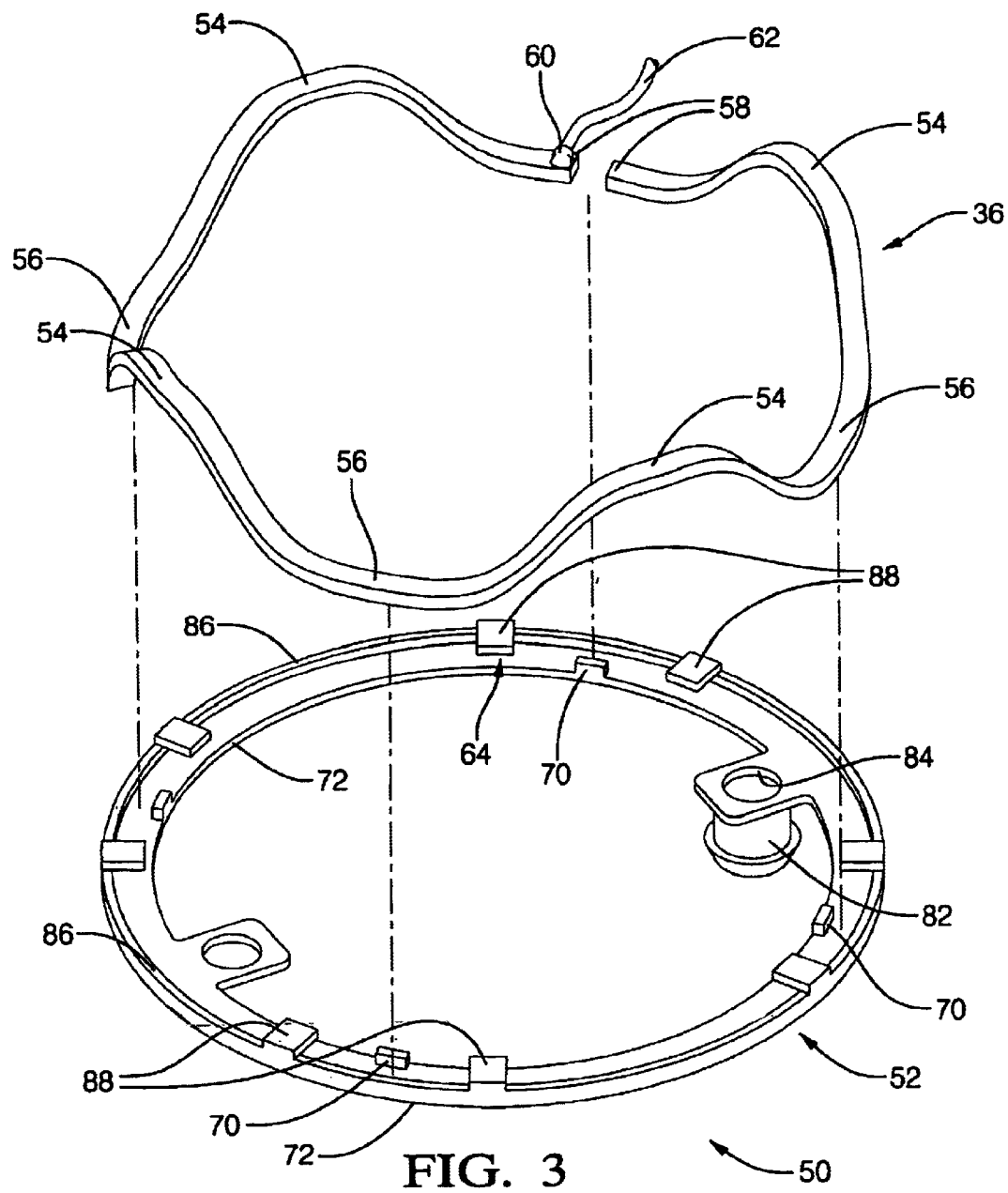
FIG. 3 is a perspective view of an exemplary horn contact spring and a corresponding retainer insulator for use with the present disclosure.

Referring now to FIGS. 2 and 3, an exemplary embodiment of a formed contact spring and retainer assembly 50 configured for use with two-point snap-in driver's side airbag modules is illustrated. Spring and retainer assembly 50 include a one-piece formed contact spring 36 and a corresponding configured insulative retainer 52. Spring 36 is substantially circularly shaped, although other shapes, such as rectangular, triangular, oval, and the like, are contemplated. Spring 36 includes four raised sections 54 forming crests of the wave shaped circular spring 36. Contiguous raised sections 54 have a valley 56 therebetween. Two ends 58 forming half valleys 56 at either end further define spring 36. A female terminal 60 is disposed over one end 58 for electrical connection therewith. Spring 36 is made of an electrically conductive material, such as stainless steel, plated steel, spring steel, CuBe, and the like. The spring material selected preferably would pass automotive specifications for a horn switch contact. A horn lead 62 extends from terminal 60 at one end and electrically connects to a connector proximate the steering column at another end. Horn lead 62 may operably act as a positive or negative side when the horn switch, configured as spring and retainer assembly 50, closes.

Retainer 52 is complimentary configured to retain spring 36 therewith and electrically isolate spring 36 from SW insert 20. Retainer 52 is substantially circularly shaped and preferably molded plastic, but any suitably moldable insulative material is contemplated. Plastic retainer 52 is preferably configured to vary the assembled height load of spring contact points between raised sections 54 and a corresponding contact 37 disposed with retainer 52. A formed piece of bare copper wire extending to each contact 37 is also contemplated to be molded into the contact spring retainer 52 to further isolate horn switch contact between each raised section 54 and a corresponding 37.

In a preferred embodiment, the single formed contact spring 36 loads against the DAB baseplate 22 at four locations corresponding to each raised section 54 of spirawave spring 36 to set an assembled height load. By loading at four locations, the mass of the DAB is stabilized relative to the steering wheel insert and offers four horn switch contact points. Spring 36 can be either a positive or negative side of the horn switch contacts. A TPA (terminal position assurance) feature 64 is optionally configured in the plastic spring retainer 52 to secure female terminal 60 to spring 36 upon assembly with retainer 52.

Spring retainer 52 may also include features incorporated therewith that are configured to align the DAB properly with the steering wheel molding assembly for better fit/function. In addition with respect to fit/function of the DAB module 18 to steering wheel, the contact spring/retainer assembly 50 is optionally installed in steering wheel insert 20 before molding on steering wheel cover material.

Still referring to FIGS. 2 and 3, the contact spring assembled height load can be varied at contact point locations 70 molded as plastic features in a base portion 72 of spring retainer 52. Each valley 56 of spring 36 is selectively disposed on a contact point location based on the desired assembled spring height that corresponds to a gap between the bottom surface of baseplate 22 and the top surface of SW insert 20. Contact point locations 70 are preferably configured to retain spring 36 and prevent translation toward an annulus defined by an interior portion defining spring 36. In one embodiment depicted in FIG. 3, a lip extends upward from base portion 72 to prevent spring 36 from translation toward the interior portion defining retainer 52.

Contact spring retainer 52 preferably is configured with a snap-fit feature 80 for ease of assembly in a corresponding and complimentary configured aperture 76 in SW insert 20. It will be recognized that aperture 76 extends to smaller aperture 40 as illustrated with respect to FIG. 2. Snap-fit feature 80 extends from a cylindrical section 82 depending from base portion 72 of retainer 52. Cylindrical section 82 has an outside diameter configured, dimensioned, and positioned to be received in aperture 76 of SW insert 20. Cylindrical section 82 is also defined by an inside diameter forming an opening 84 through retainer 52 configured to receive pin 38 therethrough. Retainer 52 having cylindrical section 82 extending therefrom is configured to provide suitable X, Y and radial displacement of DAB 18 relative to SW insert 20. For example, the spring retainer 52 is configured with two cylindrical sections 82 providing DAB location features for 2 point attachment that will establish proper fit of DAB cover to SW insert 20. In an exemplary embodiment, the spring assembled height load and spring rate are variable at each crest or raised section 54 and is regulated by plastic retention features at spring valley 56 locations as described above.

Referring again to FIGS. 2 and 3, retainer 52 further includes a cylindrical portion 86 extending from base portion 72. It will be noted that although a cylindrical section is described with reference to an exemplary embodiment, any corresponding suitable shape is contemplated in which to surround and retain a complementary configured spring 36. A plurality of intermittently spaced retention tabs 88 extend radially inwardly from cylindrical portion 86. Pairs of contiguous retention tabs 88 are configured, dimensioned and positioned to secure a corresponding valley 56 of spring 36 to base portion 72 of retainer 52. Pairs of retention tabs 88 are positioned relative to each other to urge corresponding tapering walls extending to a corresponding valley 56 toward base portion 72 of retainer 52.

Figure 4:
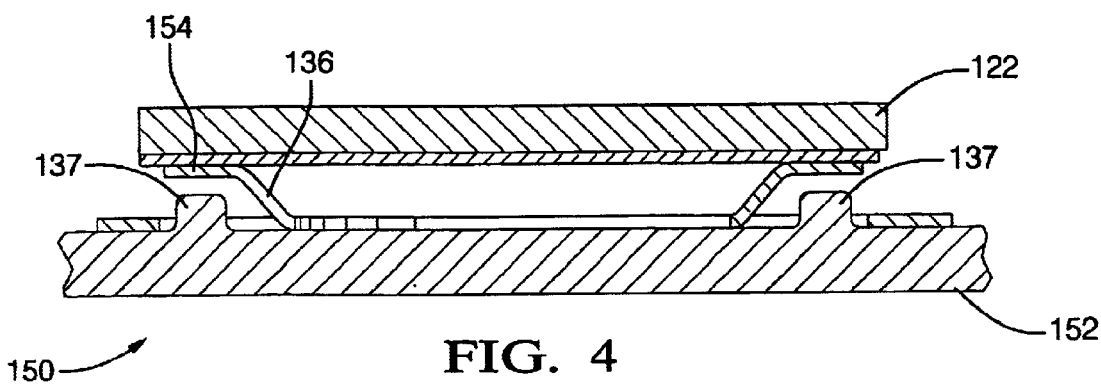
FIG. 4 is an elevation view of an alternative embodiment of a horn contact spring and corresponding retainer in operable communication with a driver's side airbag module baseplate.
Figure 5:
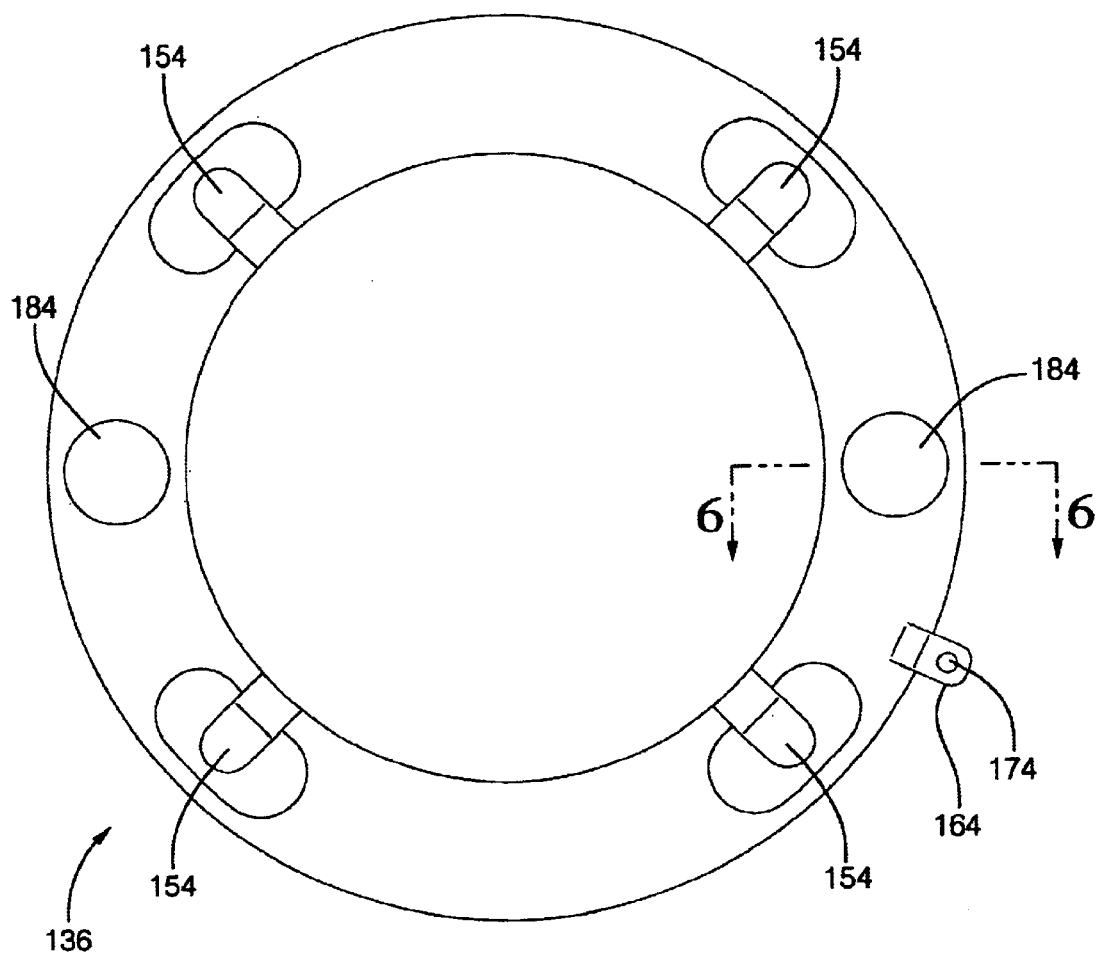
FIG. 5 is a plan view of the horn contact spring of FIG. 4 configured to secure to a steering wheel armature via two-point connection.
Figure 6:
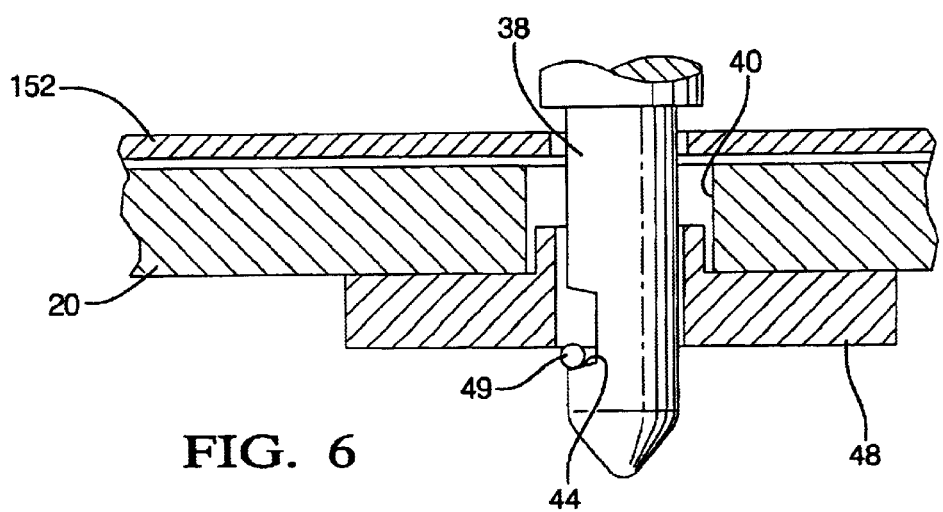
FIG. 6 is a cross sectional view from the line 6—6 of FIG. 5 when a driver's side airbag module baseplate is secured to a steering wheel armature.

Referring now to FIGS. 4–6, an alternative embodiment of a spring and corresponding retainer assembly 150 is illustrated. FIGS. 4 and 5 illustrate a stamped leaf type spring 136, for a two-point attachment to SW insert 20 using two openings 184 for corresponding locking pins 38 to extend therethrough. Spring 136 is configured having four raised sections 154 aligned with a corresponding contact 137 extending from a molded retainer 152. Spring 136 preferably includes a tab 164 extending from a periphery defining spring 136 for mounting to retainer 152. In one embodiment, tab 164 may include an aperture 174 configured to receive a fastener (not shown) therethrough to secure spring 136 to retainer 152.

Again, spring 136 and retainer 152 may be configured in any shape suitable to bias baseplate 122 away from SW insert 20 while also reducing gap variation therebetween and provide a gap in which to close to sound the horn.

Figure 7:
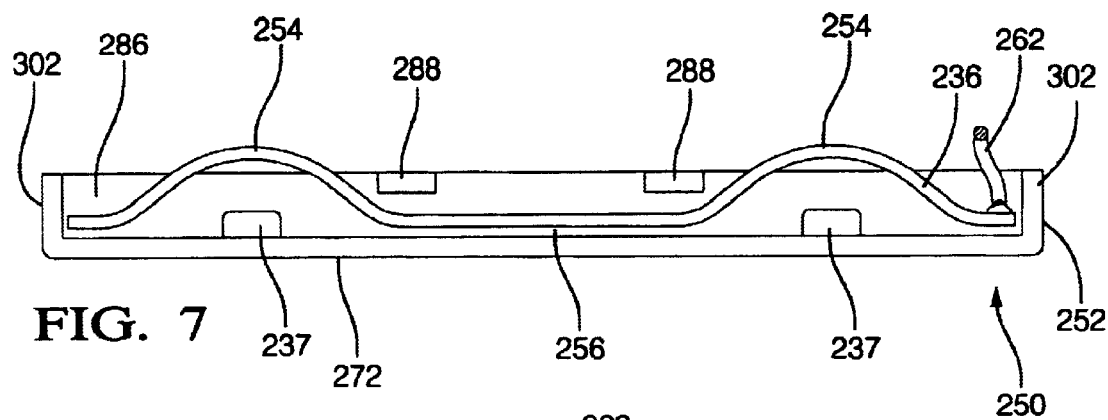
FIG. 7 is a cross sectional view of another alternative embodiment of a linear horn contact spring and corresponding retainer insulator configured for universal displacement with multiple SW/DAB designs.
Figure 8:
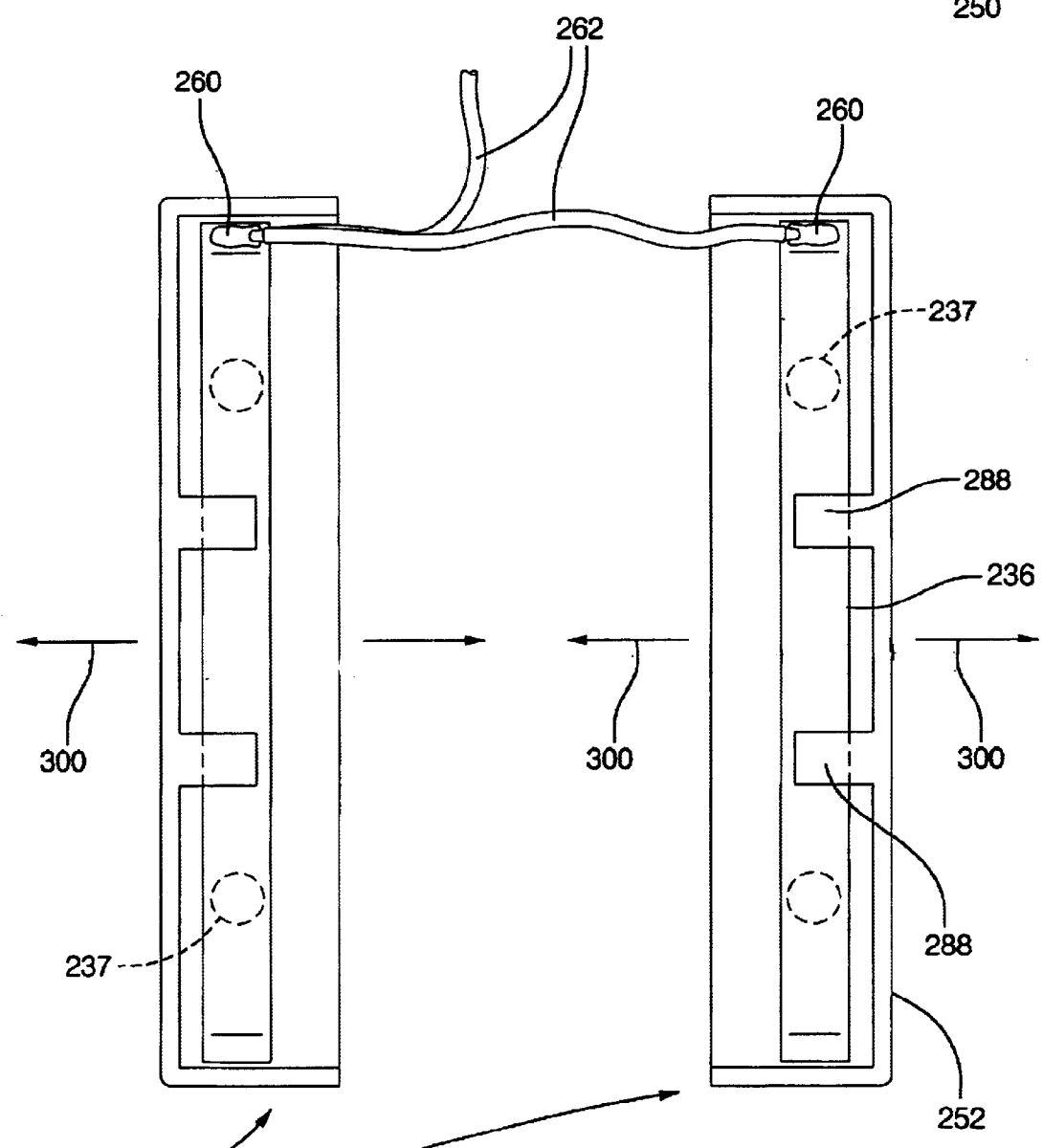
FIG. 8 is plan view of two linear horn contact springs and corresponding retainer insulators of FIG. 7 with a common horn lead therebetween.

Referring now to FIGS. 7 and 8, another alternative exemplary embodiment of a spring and corresponding retainer assembly 250 is illustrated. Spring and retainer assembly 250 include a linear wave-shaped spring 236 and a corresponding linear insulative retainer 252. In this embodiment, two spring and retainer assemblies 250 are employed using two linear formed contact springs 236 and two corresponding spring insulative retainers 252. Two assemblies are required to provide a common horn mechanism between a gap between different DAB and steering wheel insert designs. By using two separate spring and corresponding retainer assemblies 250, one or both assemblies may be moved inboard or outboard with respect to each other as generally indicated by arrows 300. In this manner, each assembly 250 provides two horn switch contact points and biasing points via two raised sections 254 on each assembly 250. By using two assemblies 250 in multiple SW/DAB designs, a four point rectangularly oriented horn switch and biasing scheme results for use as a universal horn mechanism assembly between the SW insert 20 and DAB module 18.

Each linear wave-shaped spring includes female terminal 260 disposed at one end having horn lead 262 extending therefrom. Horn leads 262 from each assembly 250 combine into a common lead that electrically connects to a connector proximate the steering column. The connector is in operable communication with the horn assembly. Common lead may operably act as a positive or negative side when the horn switch (e.g., one of two contacts 237 and corresponding raised section 254), closes.

Retainer 252 includes base portion 272 having an end wall 302 at either end defining a length of retainer 252. End walls 302 contain spring 236 and prevent translation of spring 236 towards either end of retainer 252. A side wall portion 286 extends from base portion 272 and connects to each end wall 302. Side wall portion 286 also aids in containing spring 236 within retainer 252. A pair of retention tabs 288 extend from side wall portion 286 for retaining valley 256 against base portion 272. Each retention tab 288 of the pair of retention tabs 288 is spaced from one another such that valley 256 is flattened when the valley portion of spring 236 is disposed between the pair of retention tabs 288 and base portion 272 of retainer 252.

The spring and retainer assemblies described herein provide less horn contact gap variation, better fit of DAB cover to SW, which is established by less parts in the horn mechanism. For example, in a single spring retainer assembly 50, nine parts are needed. In a double spring retainer assembly twelve parts are employed. To establish better fit, the horn spring and retainer assembly 50 may be installed in SW insert 20 before molding the steering wheel to the insert. Furthermore, the spring and retainer assemblies 50 described herein offer a lower profile when compared to current production 2-point horn mechanisms. With respect to the linear formed contact spring and retainer assembly, one or both spring and retainer assemblies 250 can be moved inboard or outboard to act as universal hardware for multiple SW/DAB designs.

It is noted that the spring and retainer assemblies are also contemplated for use with a three point-point or four-point attachment, as well as two-point attachment of a DAB to SW insert illustrated in FIGS. 2–5.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. A horn switch assembly disposed between an airbag module and a steering wheel armature comprising:
    a contact spring configured to be disposed adjacent the airbag module, said contact spring having first and second raised portions and an intermediate portion between said first and second raised portions, said first and second raised portions having a first side and a second side opposite the first side, the first and second raised portions biasing the airbag module in a first direction; and
    an insulative spring retainer being disposed between the steering wheel armature and said contact spring, said insulative spring retainer having an electrical contact, wherein at least one of said first and second raised portions of said contact spring are moved in a second direction opposite said first direction when a force is applied to the airbag module such that at least one of said first and second raised portions contact said electrical contact to energize a horn activation circuit.

2. The horn switch assembly as in claim 1, wherein said insulative spring retainer is configured to retain said intermediate portion of said contact spring between said insulative spring retainer and the airbag module.

3. The horn switch assembly as in claim 1, wherein a height of said first and second raised portions from said intermediate portion defines a distance between a portion of the airbag module and the steering wheel armature.

4. The horn switch assembly as in claim 3, wherein said distance is further controlled by features extending from said insulative spring retainer toward said steering wheel armature, said features limiting at least one of travel and spring rate of said contact spring.

5. The horn switch assembly as in claim 4, wherein said features comprise retention tabs extending from said insulative spring retainer toward said contact spring.

6. The horn switch assembly as in claim 1, wherein said insulative spring retainer has an aperture extending therethrough to receive a locking pin therein, said locking pin configured to couple the airbag module to the steering wheel armature.

7. The horn switch assembly as in claim 6, wherein said insulative spring retainer has a snap-fit feature proximate said aperture for snap-fit engagement with a corresponding opening in said steering wheel armature.

8. The horn switch assembly as in claim 1, wherein one end of said contact spring includes an electrical horn lead operably connected to said horn assembly.

9. The horn switch assembly as in claim 8, wherein said electrical horn lead extends to a connector proximate a steering column associated with the steering wheel armature.

10. The horn switch assembly as in claim 1, wherein said insulative spring retainer insulates said contact spring from said steering wheel armature.

11. The horn switch assembly as in claim 1, wherein said insulative spring retainer comprises a plastic spring retainer.

12. The horn switch assembly as in claim 1, wherein said contact spring comprises an electrically conductive metallic contact spring.

13. The horn switch assembly as in claim 1, wherein said contact spring is constructed from at least one of stainless steel, plated steel, spring steel, and CuBe.

14. The horn switch assembly as in claim 1, wherein said electrical contact is one of a positive and a negative horn switch contact.

15. The horn switch assembly of claim 1, wherein said insulative spring retainer is substantially ring-shaped.

16. The horn switch assembly of claim 1, wherein said spring is a linear wave shaped spring.

17. The horn switch assembly of claim 1, wherein said contact spring has a generally arcuate-shaped periphery.

18. The horn switch assembly of claim 1, wherein said contact spring is a wave-shaped contact spring.

19. A method for assemblying a horn switch assembly between an airbag module and a steering wheel armature, the method comprising:
    disposing an insulative spring retainer on the steering wheel armature, said insulative spring retainer having a first side and a second side, said first side being disposed on said steering wheel armature, said second side having an electrical contact disposed thereon;

disposing a contact spring on said second side of said insulative spring retainer, said contact spring having first and second raised portions and an intermediate portion between said first and second raised portions, said insulative spring retainer insulating said contact spring from said steering wheel armature;

disposing the air bag module on said contact spring, said first and second raised portions of said contact spring biasing the airbag module in a first direction, wherein at least one of said first and second raised portions of said contact spring are moved in a second direction opposite said first direction when a force is applied to the airbag module such that at least one of said first and second raised portions contact said electrical contact to energize a horn activation circuit.

20. A steering wheel assembly, comprising:

a steering wheel armature;

an insulative spring retainer having a first side configured to be disposed on the steering wheel armature, and an opposite second side, said insulative spring retainer having an electrical contact disposed on said second side;

a contact spring disposed on said second side of said insulative spring retainer, said contact spring having first and second raised portions and an intermediate portion between said first and second raised portions, said insulative spring retainer insulating said contact spring from said steering wheel armature; and an air bag module disposed on said contact spring, said first and second raised portions of said contact spring biasing said airbag module in a first direction, wherein at least one of said first and second raised portions of said contact spring are moved in a second direction opposite said first direction when a force is applied to the airbag module such that at least one of said first and second raised portions contact said electrical contact to energize a horn activation circuit.

21. The steering wheel assembly as in claim 20, wherein said intermediate portion of said insulative spring retainer is configured to retain a portion of said contact spring between said insulative spring retainer and the airbag module.

22. The steering wheel assembly as in claim 20, wherein said insulative spring retainer is a plastic spring retainer.

23. The steering wheel assembly as in claim 20, wherein said insulative spring retainer is substantially ring-shaped.

24. The steering wheel assembly as in claim 20, wherein said spring is a linear wave shaped spring.

25. The steering wheel assembly as in claim 20, wherein said contact spring has a generally arcuate-shaped periphery.

* * * * *